United States Patent
Chung et al.

(10) Patent No.: US 10,495,909 B2
(45) Date of Patent: Dec. 3, 2019

(54) DISPLAY APPARATUS COMPRISING A FILLER HAVING FIRST AND SECOND FILLING MATERIALS PROVIDED BETWEEN A COVER GLASS AND A CASE AND MANUFACTURING METHOD THEREOF

(71) Applicant: SAMSUNG ELECTRONICS CO., LTD., Suwon-si, Gyeonggi-do (KR)

(72) Inventors: Soon-wan Chung, Suwon (KR); Jae-bok Kwak, Hwaseong (KR); Chang-jae Kim, Hwaseong (KR); Youn-seong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 514 days.

(21) Appl. No.: 15/094,511

(22) Filed: Apr. 8, 2016

(65) Prior Publication Data

US 2017/0026500 A1     Jan. 26, 2017

(30) Foreign Application Priority Data

Jul. 20, 2015   (KR) .................. 10-2015-0102206

(51) Int. Cl.
 *G02F 1/1333*   (2006.01)
 *H04M 1/18*   (2006.01)
 *H04M 1/02*   (2006.01)

(52) U.S. Cl.
 CPC ...... *G02F 1/133308* (2013.01); *H04M 1/185* (2013.01); *G02F 2001/13332* (2013.01); *G02F 2001/133322* (2013.01); *G02F 2001/133331* (2013.01); *G02F 2201/50* (2013.01); *G02F 2201/503* (2013.01); *G02F 2202/28* (2013.01); *H04M 1/0266* (2013.01)

(58) Field of Classification Search
 CPC .................................................... H04M 1/185
 See application file for complete search history.

(56) References Cited

U.S. PATENT DOCUMENTS

| | | | | |
|---|---|---|---|---|
| 2012/0162563 | A1* | 6/2012 | Lai | G02F 1/133512 349/58 |
| 2012/0281383 | A1* | 11/2012 | Hwang | G02F 1/133308 361/807 |
| 2013/0182311 | A1* | 7/2013 | Mochizuki | G02F 1/172 359/296 |
| 2014/0239781 | A1* | 8/2014 | Allore | B29C 45/14311 312/223.1 |

* cited by examiner

*Primary Examiner* — Paul C Lee
(74) *Attorney, Agent, or Firm* — Staas & Halsey LLP

(57) ABSTRACT

A display apparatus is provided. The display apparatus includes a case in which a receiving portion, which a display is placed therein, is formed, a glass disposed in front of the display in the receiving portion, and a filler provided between the glass and the case to bond the glass and the case and simultaneously to protect the glass from an external shock. The filler includes a first filling material provided between the case and the glass to primarily bond the case and the glass and a second filling material provided between the case and the glass to cover a portion of a front of the glass to secondarily bond the case and the glass.

20 Claims, 17 Drawing Sheets

DISPLAY APPARATUS COMPRISING A FILLER HAVING FIRST AND SECOND FILLING MATERIALS PROVIDED BETWEEN A COVER GLASS AND A CASE AND MANUFACTURING METHOD THEREOF

CROSS-REFERENCE TO RELATED APPLICATIONS

This application claims priority from Korean Patent Application No. 10-2015-0102206, filed on Jul. 20, 2015, in the Korean Intellectual Property Office, the disclosure of which is incorporated herein by reference in its entirety.

BACKGROUND OF THE DISCLOSURE

Field of the Disclosure

Apparatuses and methods consistent with exemplary embodiments relate to a display apparatus and a manufacturing method thereof, and more particularly, to a display apparatus capable of protecting a glass from an external shock and a manufacturing method thereof.

Description of the Related Art

In recent years, the users demand a large-scaled screen in display apparatuses such as a smart phone, a phablet, and a tablet and simultaneously demand the overall size of the display apparatuses as small as possible.

According to the demands of the users, the current display apparatuses may provide a maximum screen in a limited size by employing the so-called narrow-bezel design which minimizes a bezel between a case and a display and by increasing a size of the display by the reduced size of the bezel.

In the typical display apparatuses, a display may be placed in a receiving portion formed in the inside of the case, a bezel is disposed along a border of the display, and then a glass is fixed to the case to protect the display so that the display is disposed in front of the display, that is, the display is disposed between the case and the glass. The glass may be bonded to the bezel.

However, as a bonding area between the case and the glass may be reduced due to the application of the narrow-bezel design in the current display apparatuses, it may be difficult to accomplish the robust bonding between the case and the glass. The bonding portion between the case and the glass may serve as a buffer which alleviates transfer of the external shock applied to the case to the glass in response to the display apparatus being falling in a state that the display apparatus is laid down. However, as the bonding area between the case and the glass is reduced, the buffering effect may be reduced.

In the display apparatus in the related art, a space having a preset size may be formed between an outer side of the glass and an inner side of the receiving portion of the case. The space may protect the glass by serving as a buffer so as not to directly transfer the external shock applied to the case to the glass in response to the display apparatus being falling in a state that the display apparatus is laid on its side. However, the space serving as the buffer may also be reduced according to the application of the narrow-bezel design to the display apparatuses, and thus the external shock may be directly transferred to the glass through the case in response to the display apparatus being falling in the state that the display apparatus is laid on its side.

Accordingly, the buffering function may be supplemented in the current display apparatuses by reinforcing the strength of the glass or by ensuring the thickness and rigidity of the case, but there is a difficulty in ensuring the space between the glass and the case due to the narrow-bezel design and there is a limit to overcome the problems due to the reduction in the bonding area between the glass and the case.

In general, the display apparatuses may fall in a state that the display apparatuses are laid down or laid on its side to receive a primary shock and then may fall upside down to receive a secondary shock, and the secondary shock may directly affect the glass.

SUMMARY OF THE DISCLOSURE

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to a display apparatus capable of buffering a shock transferred to a glass in falling of the display apparatus and a manufacturing method thereof.

One or more exemplary embodiments relate to a display apparatus capable of accomplishing robust coupling between a glass and a case and a manufacturing method thereof.

According to an aspect of an exemplary embodiment, there is provided a display apparatus including a case in which a receiving portion, which a display is placed therein, is formed; a glass disposed in front of the display in the receiving portion; and a filler provided between the glass and the case to bond the glass and the case and simultaneously to protect the glass from an external shock. The filler may include a first filling material provided between the case and the glass to primarily bond the case and the glass and a second filling material provided between the case and the glass to cover a portion of a front of the glass to secondarily bond the case and the glass.

According to an aspect of an exemplary embodiment, there is provided a method of manufacturing a display apparatus, the method including primarily bonding a case and a glass through a first filling material having a shock resistance; and secondarily bonding the case and the glass through a second filling material provided close to the first filling material and having a shock resistance. The second filling material in the secondary bonding may be provided to cover a portion of a front of the glass.

Additional aspects and advantages of the exemplary embodiments are set forth in the detailed description, and will be obvious from the detailed description, or may be learned by practicing the exemplary embodiments.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
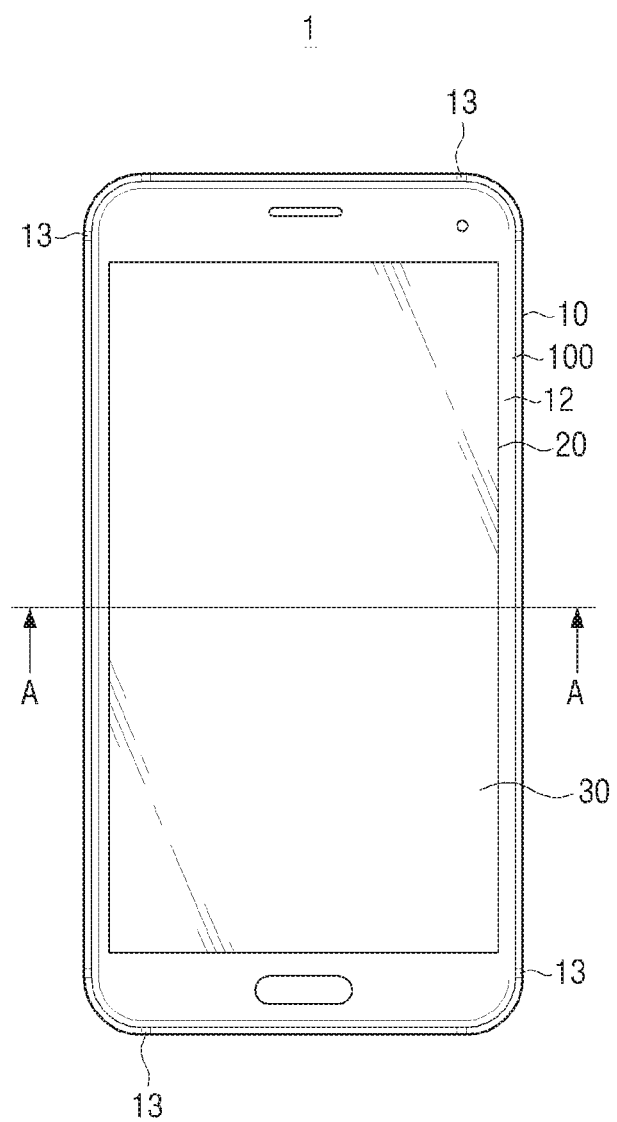
FIG. 1 is a plan view illustrating a display apparatus according to a first exemplary embodiment.

Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

Display apparatuses according to exemplary embodiments may be apparatuses including a display such as a smart phone, a phablet, or a tablet, and hereinafter, the smart phone as the display apparatuses will be exemplarily described.

Figure 2:
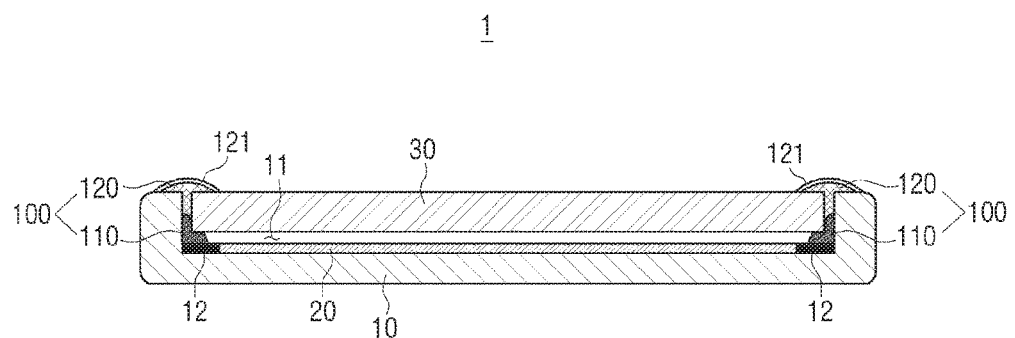
FIG. 2 is a cross-sectional view illustrating the display apparatus taken along line A-A of FIG. 1.

Referring to FIGS. 1 and 2, a display apparatus 1 according to a first exemplary embodiment may include a case 10, a display 20, a glass 30, and a filler 100.

The case 10 may form an outer appearance of the display apparatus 1, and may be formed of a metal material or a plastic material. The case 10 may include a receiving portion 11, a bezel 12, and a segment portion 13.

The receiving portion 11 may be an internal space of the case 10 in which the display 20 and the glass 30 are placed, and the receiving portion may be formed larger than the glass 30 by a preset size so that the filler 100 to be described later may be disposed. The filler 100 may be provided in the receiving portion 11 between the case 10 and the glass 30 and will be described later.

The bezel 12 may be provided along a circumference of the display 20, and may alleviate a shock applied to the display 20 in falling of the display apparatus 1. The display apparatus 1 according to the first exemplary embodiment may employ the narrow-bezel design, and thus the size of the display 20 may be further increased in the display apparatus 1 having the fixed size.

In response to the case 10 being formed of a metal material, the segment portion 13 may be formed in a portion of a side circumference of the case 10 in order for the display apparatus 1 to perform wireless communication. In response to the case 10 being formed of not the metal material but a plastic material, the segment portion 13 may be omitted. For example, the segment portion 13 in FIG. 1 may be provided by two in each of four directions along the side circumference of the case 10. In another example, the segment portion 13 may be provided only in facing two directions and may be provided one or three or more in each direction.

The display 20 may display information to the user and may be placed in the receiving portion 11 of the case 10. The display 20 may include a touch sensor (not shown) to allow the user to input a command through a touch. The display 20 has been known and detailed description thereof will be omitted.

The glass 30 may be provided in front of the display 20, that is, in a front 11c of the case 10 to protect the display 20 from an external shock, and the glass 30 may be high-strength glass. The glass 30 may be bonded to the receiving portion 11 of the case 10 through the filler 100 to be described later.

The filler 100 may be provided along an inner side 11a of the receiving portion 11 of the case 10 and an outer side 30a of the glass 30 to bond the case 10 and the glass 30 and simultaneously to alleviate the transfer of the shock applied to the case 10 to the glass 30. For example, the filler 100 according to the first exemplary embodiment may be provided to be in contact with a portion of a rear 11b and the inner side 11a of the receiving portion 11, a portion of the front 11c of the case 10, and a portion of a rear 30b, the outer side 30a, and a portion of a front 30c of the glass 30. The filler 100 may include a first filling material 110 and a second filling material 120.

The first filling material 110 may include a material having an adhesion to primarily bond the case 10 and the glass 30. For example, the first filling material 110 may be in contact with the portion of the rear 11b and a portion of the inner side 11a of the receiving portion 11 and the portion of the rear 30b and a portion of the outer side 30a of the glass 30. The first filling material 110 may include a shock-resistant material to alleviate the transfer of the shock applied to a side and a rear of the display apparatus 1 to the glass 30.

The first filling material 110 may be applied in a corner of the case 10 in which the rear 11b and the inner side 11a of the receiving portion 11 intersect with each other to bond the case 10 and the glass 30, and thus the first filling material 110 may have thixotrophy so as not to flow down after the first filling material 110 is applied in the corner.

The first filling material 110 may also be provided in a portion of the case 10 in which the segment portion 13 is formed to integrally bond the case 10, the glass 30, and the segment portion 13. According to the display apparatus 1 according to the first exemplary embodiment, the first filling material 110 may also be provided in the portion in which the segment 13 is formed to prevent a crack which easily occurs in the segment portion 13.

The second filling material 120 may include a material having an adhesion to secondarily bond the case 10 and the glass 30. For example, the second filling material 120 may be in contact with a portion of the inner side 11a of the receiving portion 11, a portion of the outer side 30a and the portion of the front 30c of the glass 30, and the portion of the front 11c of the case 10. That is, the second filling material 120 may be provided to cover the portion of the front 11c of the case 10 and the portion of the front 30c of the glass 30.

The second filling material 120 may include a shock-resistant material to alleviate the transfer of the shock applied to the side and a top of the display apparatus 1 to the glass 30. Accordingly, the second filling material 120 may alleviate the shock transferred to the glass 30 in response to the display apparatus 1 being falling in a state the display apparatus is laid on its side as well as in a state that the display apparatus is laid facing down.

The second filling material 120 may be applied to cover the portion of the front 11c of the case 10 and the portion of the front 30c of the glass 30 from the space in which the first filling material 110 is provided between the case 10 and the glass 30. However, since the second filling material 120 may penetrate and bury even the space in which the first filling material 110 is not filled between the case 10 and the glass 30, the second filling material 120 may have thixotrophy less than the first filling material 110.

Like the first filling material 110, the second filling material 120 may also be provided in the portion of the case 10 in which the segment portion 13 is formed to integrally bond the case 10, the glass 30, and the segment portion 13. According to the display apparatus 1 according to the first exemplary embodiment, the first filling material 110 and the second filling material 120 may be provided in the portion in which the segment 13 is formed to prevent a damage which easily occurs in the segment portion 13.

A coating unit 121, which is appropriately coating-treated to improve the grip of the user and the overall aesthetics of the display apparatus 1, may be included in a portion of the second filling material 120 which covers the portion of the front 11c of the case 10 and the portion of the front 30c of the glass 30.

At least one of the first filling material 110 and the second filling material 120 may include any one of a hot-melt adhesive, a UV curable adhesive, and a cured in-place gasket (CIPG). The first and second filling materials 110 and 120 may be formed of the same material having appropriate thixotrophy.

Hereinafter, a method of manufacturing the display apparatus 1 having the above-described configuration according to the first exemplary embodiment will be described with reference to FIGS. 3 to 6.

Figure 3:
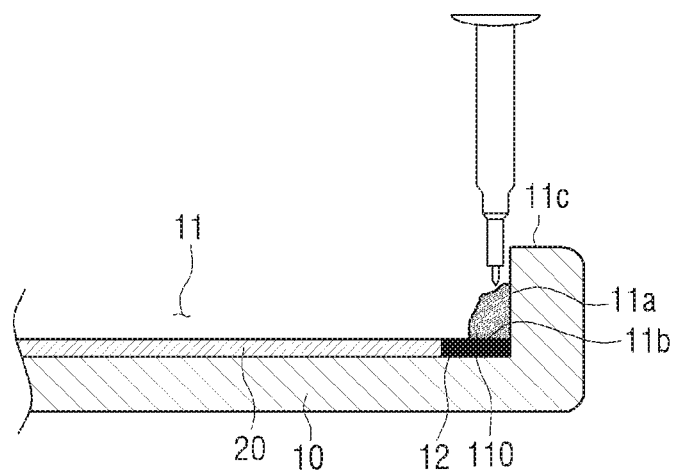
FIGS. 3 to 6 are schematic diagrams sequentially illustrating a manufacturing method of a display apparatus according to the first exemplary embodiment.

Referring to FIG. 3, the first filling material 110 may be applied in the corner portion of the case 10 in which the inner side 11a and the rear 11b of the receiving portion 11, which the display 20 is placed therein, intersect with each other. The first filling material 110 may be continuously applied in an inner corner of the receiving portion 11 along a circumference of the case 10. However, the applying method is not limited thereto, and the first filling material 110 may be intermittently applied.

The first filling material 110 may be applied through any one of a dispensing method and a jetting method. However, since it is not necessary to finely apply the first filling material 110, the first filling material 110 may be applied using the dispensing method.

Figure 4:
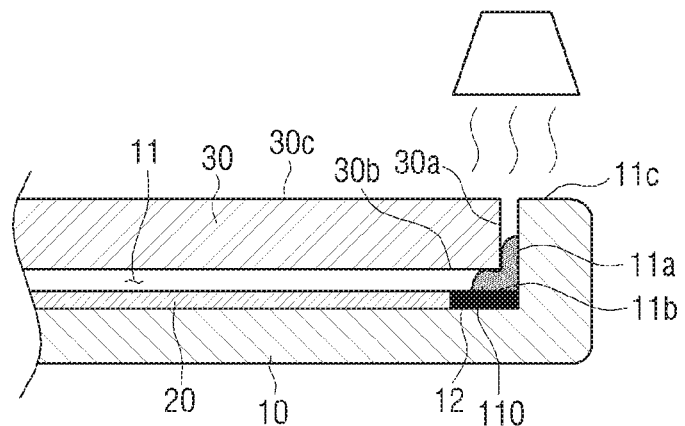

Referring to FIG. 4, the glass 30 may be placed in the receiving portion 11 of the case 10 and bonded to the case 10. For example, since the first filling material 110 is in a semi-solid state before curing, in response to the glass 30 being pressed to be placed in the receiving portion 11 in a state that the outer side 30a and the rear 30b of the glass 30 are in contact with the first filling material 110, the first filling material 110 may be spread along the inner side 11a and the rear 11b of the receiving portion 11. Accordingly, the first filling material 110 may be in contact with the portion of the inner side 11a and the portion of the rear 11b of the receiving portion 11 in the case 10 and the portion of the outer side 30a and the rear 30b of the glass 30 to mutually bond the case 10 and the glass 30.

The first filling material 110 may be cured. The first filling material 110 may be cured through any one of a room temperature wet curing method, a UV curing method, a thermal curing method, and a laser curing method in consideration of the property of the first filling material 110. For example, in response to the first filling material 110 being formed of a material to which the UV curing method is applicable, the curing process may be performed before the bonding of the glass 30. In another example, in response to the first filling material 110 being formed of a material to which any one of the thermal curing method, the room temperature wet curing method, and the laser curing method is applicable, the curing process may be performed after the bonding of the glass 30. Accordingly, any one of the thermal curing method, the room temperature wet curing method, and the laser curing method may be applied to cure the first filling material 110 in the exemplary embodiment.

Figure 5:
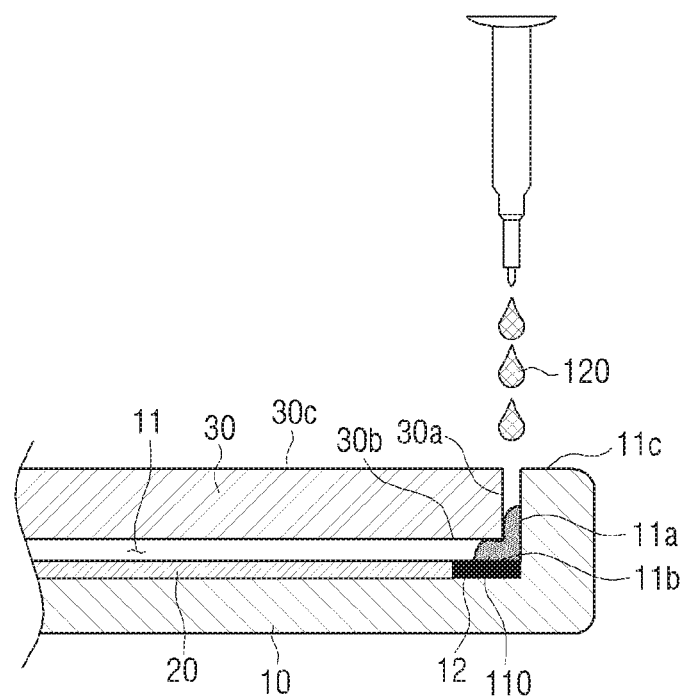

Referring to FIG. 5, the second filling material 120 may be applied between the case 10 and the glass 30 which the cured first filling material 110 is included therebetween. The second filling material 120 may be applied through any one of a dispensing method and a jetting method like the applying method of the first filling material 110. However, since the second filling material 120 has to penetrate the narrow space between the case 10 and the glass 30, the second filling material 120 may be applied through the jetting method as a finer applying method.

Figure 6:
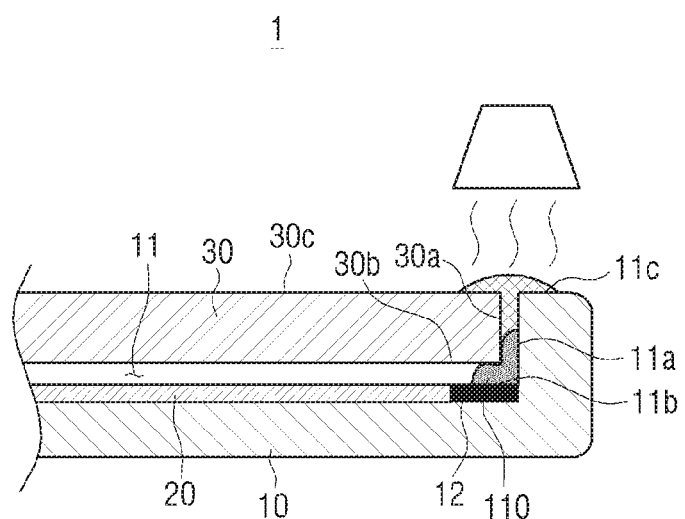

Referring to FIG. 6, the second filling material 120 may be applied until the portion of the front 30c of the glass 30 and the portion of the front 11c of the case 10 are covered. Accordingly, the second filling material 120 may be provided to protrude from the case 10 and the glass 30.

Subsequently, the second filling material 120 may be cured. Like the curing method of the first filling material 110, the curing of the second filling material 120 may be performed through any one of a room temperature wet curing method, a UV curing method, a thermal curing method, and a laser curing method in consideration of the property of the second filling material 120.

After the applying of the second filling material 120, a coating treatment may be performed on a portion of the second filling material 120 protruding from the case 10 and the glass 30 to improve the grip and the overall aesthetics of the display apparatus 1.

The display apparatus 1 according to the first exemplary embodiment may bond the inner side 11a and the portion of the rear 11b of the case 10 and the outer side 30a and the portion of the rear 30b of the glass 30 and simultaneously may alleviate the shock transferred from the case 10 to the glass 30 through the filler 100. Accordingly, even in response to the narrow-bezel design being applied to the display apparatus 1, the breakage of the glass 30 may be minimized and the glass 30 may be rigidly fixed to the case 10.

As the second filling material 120 is provided to protrude from the case 10 and the glass 30, the breakage of the glass 30 in the display apparatus 1 according to the first exemplary embodiment may be minimized even in response to the display apparatus 1 being falling upside down.

A display apparatus 2 according to a second exemplary embodiment will be described with reference to FIGS. 7 to 11. Like numbers in the display apparatus 1 according to the first exemplary embodiment refer to like elements such as the display 20 and the glass 30 in the display apparatus 2 according to the second exemplary embodiment, and thus detailed description thereof will be omitted, and only a case 40 and a filler 200 different from the case 10 and the filler 100 will be described.

The case 40 in the display apparatus 2 according to the second exemplary embodiment may form an outer appearance of the display apparatus 2 and may be formed of a metal material or a plastic material like the case 10 in the first exemplary embodiment. The case 40 according to the second exemplary embodiment may be different from the case 10 in the first exemplary embodiment in that a groove 44 provided with a first filling material 210 may be formed in a corner portion of the case 40 in which an inner side 41a and a rear 41b of a receiving portion 41 intersect with each other.

For example, the groove 44 may be continuously or discontinuously formed in the corner portion, in which the inner side 41a and the rear 41b of the receiving portion 41 intersect with each other, along the circumference of the case 40 so that an amount of the first filling material 210 greater than that of the first filling material 110 in the first exemplary embodiment may be provided. It has been illustrated in FIG. 7 that a cross-section of the groove 44 is a triangular shape. However, the groove 44 may be formed in a polygonal shape such as a quadrangle or pentagon or may be concavely formed substantially in a circular shape. The groove 44 may have any shape which may include the first filling material 210 greater than the first filling material 110 in the first exemplary embodiment.

The filler 200 may be provided between the case 40 and the glass 30 to bond the case 40 and the glass 30 and simultaneously to alleviate the transfer of a shock applied to the case 40 to the glass 30. For example, the filler 200 according to the second exemplary embodiment may be provided to be in contact with a portion of the rear 41b and the inner side 41a of the receiving portion 41, a portion of a front 41c and the groove 44 of the case 40, and a portion of a rear 30b, an outer side 30a, and a portion of a front 30c of the glass 30. That is, a first filing material 210 in the display apparatus 2 according to the second exemplary embodiment may be different from the first filling material 110 according to the first exemplary embodiment in that the first filling material 210 is also filled within the groove 44 of the case 40.

The other configurations (for example, bonding structure) and properties of the first and second filling materials 210 and 220 are the same as those in the filler 100 according to the first exemplary embodiment, and thus detailed description thereof will be omitted.

Hereinafter, a method of manufacturing the display apparatus 2 having the above-described configuration according to the second exemplary embodiment will be described with reference to FIGS. 7 to 11. A portion of the manufacturing method of the display apparatus 2 according to the second exemplary embodiment overlapping the manufacturing method of the display apparatus 1 according to the first exemplary embodiment will be briefly described.

Figure 7:
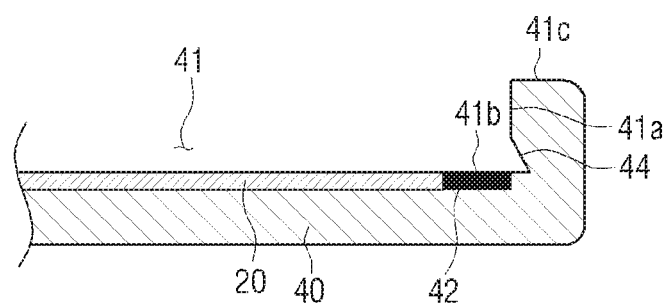
FIGS. 7 to 11 are schematic diagrams sequentially illustrating a manufacturing method of a display apparatus according to a second exemplary embodiment.

Referring to FIG. 7, the case 40 in which the display 20 is placed and the groove 44 is formed may be prepared.

Figure 8:
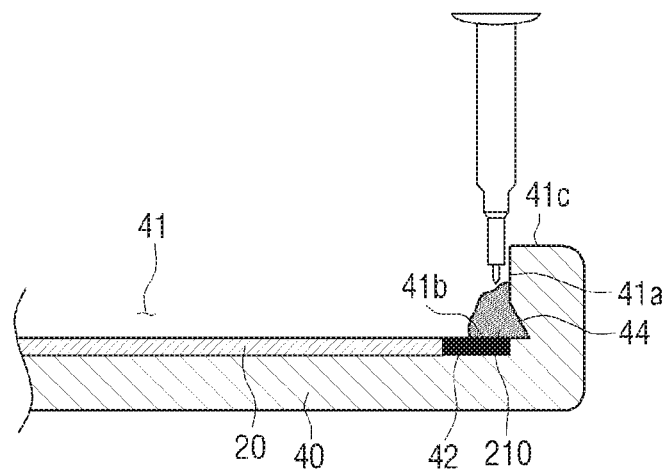

Referring to FIG. 8, the first filling material 210 may be applied in the corner portion of the case 40 in which the inner side 41a and the rear 41b of the receiving portion 41 intersect with each other. The first filling material 210 may be sufficiently applied so that the first filling material 210 may also be filled within the groove 44. Like the first filling material 110 according to the first exemplary embodiment, the first filling material 210 according to the second exemplary embodiment may be continuously or intermittently applied in the inner corner of the receiving portion 41 along the circumference of the case 40. Like the first filling material 110 according to the first exemplary embodiment, the first filling material 210 according to the second exemplary embodiment may be applied through any one of a dispensing method and a jetting method.

Figure 9:
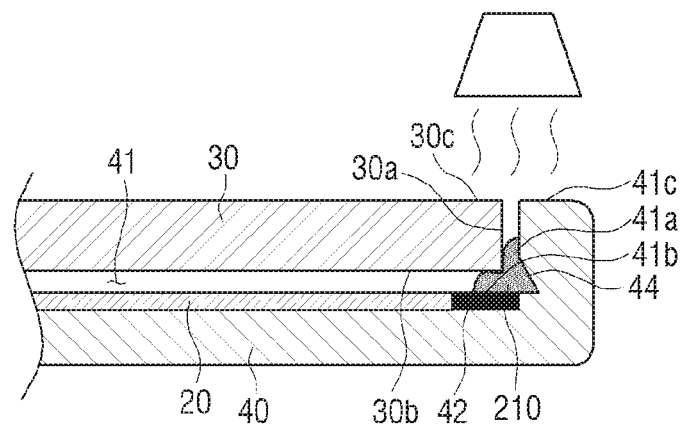

Referring to FIG. 9, the glass 30 may be placed in the receiving portion 41 and bonded to the case 40. For example, the glass 30 may be pressed in a state that the outer side 30a and the rear 30b of the glass 30 are in contact with the first filling material 210 so that the glass 30 may be placed in the receiving portion 41 as in the exemplary embodiment. Accordingly, the first filling material 210 may be in contact with a portion of the inner side 41a and the portion of the rear 41b of the receiving portion 41 in the case 40 and a portion of the outer side 30a and the portion of the rear 30b of the glass 30 and may mutually bond the case 40 and the glass 30.

Subsequently, the first filling material 210 may be cured. As in the first exemplary embodiment, the first filling material 210 may be cured through various curing methods. For example, in response to the first filling material 210 being formed of a material to which a UV curing method is applicable, the curing process may be performed before the bonding of the glass 30. In another example, in response to the first filling material 210 being formed of a material to which any one of a thermal curing method, a room temperature wet curing method, and a laser curing method is applicable, the curing process may be performed after the bonding of the glass 30. Accordingly, any one of the thermal curing method, the room temperature wet curing method, and the laser curing method may be applied to cure the first filling material 210 in the exemplary embodiment.

Figure 10:
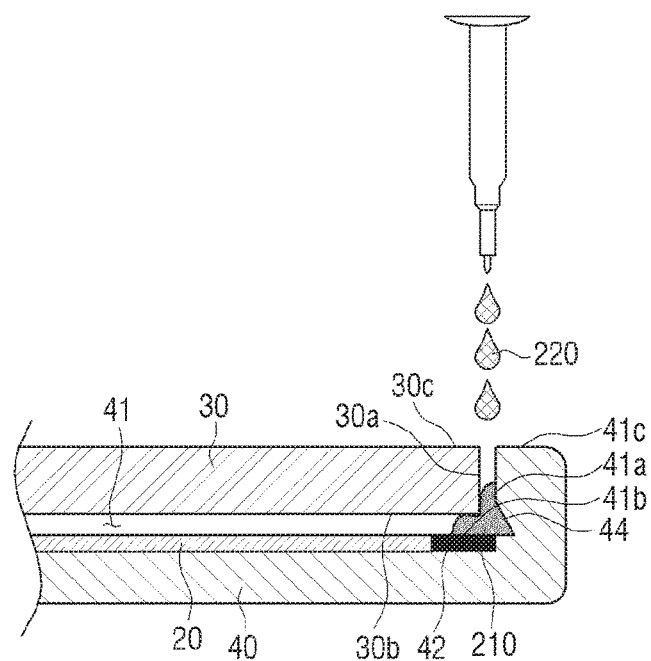

Referring to FIG. 10, the second filling material 220 may be applied between the case 40 and the glass 30 which the cured first filling material 210 is included therebetween. The second filling material 220 may be applied through any one of a dispensing method and a jetting method as in the second exemplary embodiment. For example, the second filling material 220 may be applied through the jetting method for finer applying.

Figure 11:
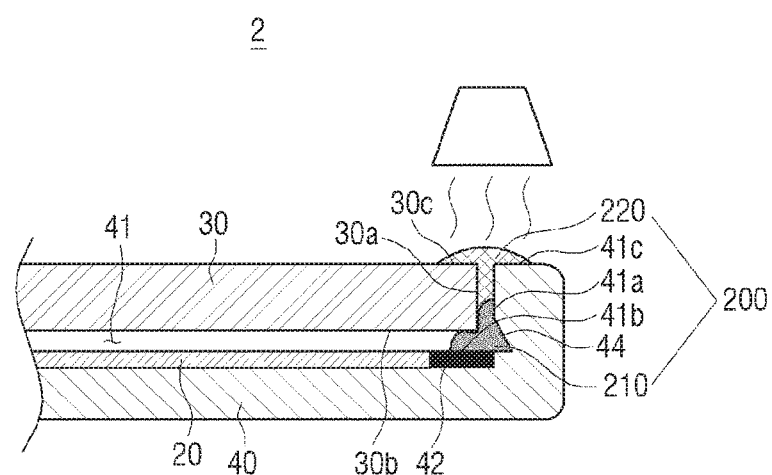

Referring to FIG. 11, as in the first exemplary embodiment, the second filling material 220 may be applied until the portion of the front 30c of the glass 30 and the portion of the front 41c of the case 40 are covered. Accordingly, the second filling material 220 according to the second exemplary embodiment may also be provided to protrude from the case 40 and the glass 30.

Subsequently, as in an exemplary embodiment, the second filling material 220 may be cured. As in the first exemplary embodiment, the curing of the second filling material 220 may be performed through various curing methods.

As in the first exemplary embodiment, the coating treatment may be performed on the protruding portion of the second filling material 220.

As compared with the first exemplary embodiment, a large amount of the first filling material 210 may be provided in the display apparatus 2 according to the second exemplary embodiment, and thus the buffer effect may be further improved.

Hereinafter, a display apparatus 3 according to a third exemplary embodiment will be described with reference to FIGS. 12 to 17. Like numbers in the display apparatus 1 according to the first exemplary embodiment refer to like elements such as the case 10, the display 20, and the glass 30 in the display apparatus 3 according to the third exemplary embodiment, and thus detailed description thereof will be omitted, and only a filler 300 different from the filler 100 will be described.

Figure 17:
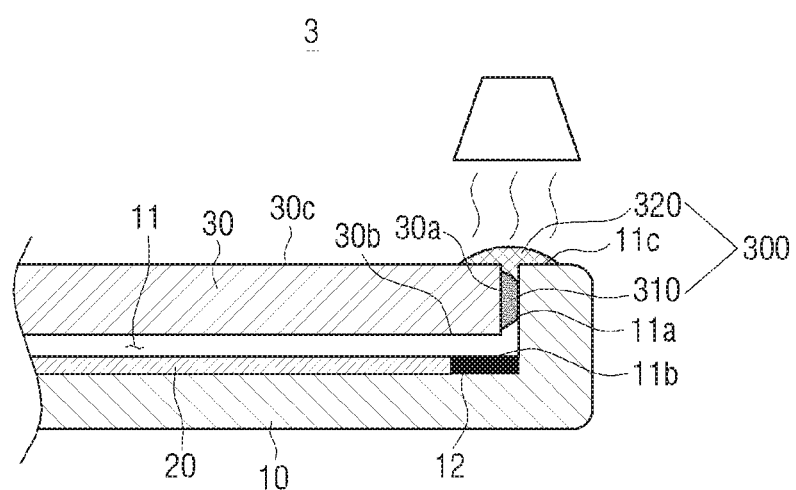

Referring to FIG. 17, the filler 300 of the display apparatus according to the third exemplary embodiment may be provided between the case 10 and the glass 30 to bond the case 10 and the glass 30 and simultaneously to alleviate the transfer of the shock applied to the case 10 to the glass 30. For example, the filler 300 according to the third exemplary embodiment may be provided to be in contact with an inner side 11a of the receiving portion 11, a portion of a front 11c of the case 10, and an outer side 30a and a portion of a front 30c of the glass 30. That is, a first filing material 310 in the display apparatus 3 according to the third exemplary embodiment may be different from the first filling material 110 according to the first exemplary embodiment in that the first filling material 310 is provided only between the inner side 11a of the receiving portion 11 and the outer side 30a of the glass 30 and may not be provided in a rear 11b of the receiving unit 11 and a rear 30b of the glass 30.

The first filling material 310 may be continuously or discontinuously applied along the outer side 30a of the glass 30 and cured, and then the glass 30 may be placed into the case 10. Subsequently, the first filling material 310 may be made in a semi-solid state again by applying heat or UV and then may be uniformly spread between the inner side 11a of the receiving portion 11 and the outer side 30a of the glass 30. Accordingly, the first filling material 310 may include a thermoplastic material.

The other configurations (for example, bonding structure) and properties of the first and second filling materials 310 and 320 are the same as those in the filler 100 according to the first exemplary embodiment, and thus detailed description thereof will be omitted.

Hereinafter, a method of manufacturing the display apparatus 3 having the above-described configuration according to the third exemplary embodiment will be described with reference to FIGS. 12 to 17. A portion of the manufacturing method of the display apparatus 3 according to the third exemplary embodiment overlapping the manufacturing method of the display apparatus 1 according to the first exemplary embodiment will be briefly described.

Figure 12:
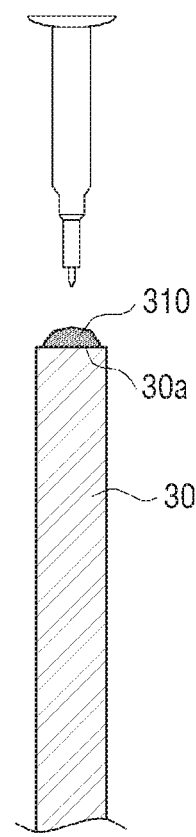
FIGS. 12 to 17 are schematic diagrams sequentially illustrating a manufacturing method of a display apparatus according to a third exemplary embodiment.

Referring to FIG. 12 the first filling material 310 may be applied along the outer side 30a of the glass 30. The first filling material 310 may be continuously or discontinuously applied along the outer side 30a of the glass 30. The first filling material 310 may be applied through any one of a dispensing method and a jetting method.

Figure 13:
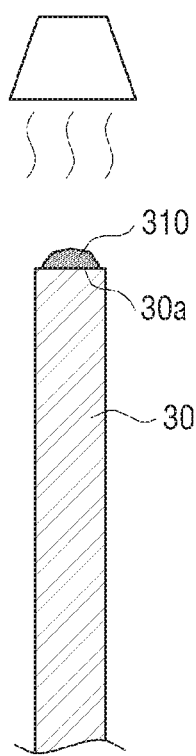

Referring to FIG. 13, the first filling material 310 applied along the outer side 30a of the glass 30 may be cured. As in the first exemplary embodiment, any one of various curing methods may be applied to cure the first filling material 310. For example, in response to the first filling material 310 being formed of a material to which a UV curing method is applicable, the curing process may be performed before the bonding of the glass 30. In another example, in response to the first filling material 310 being formed of a material to which any one of a thermal curing method, a room temperature wet curing method, and a laser curing method is applicable, the curing process may be performed after the bonding of the glass 30. Accordingly, any one of the thermal curing method, the room temperature wet curing method, and the laser curing method may be applied to cure the first filling material 310 in the exemplary embodiment.

Figure 14:
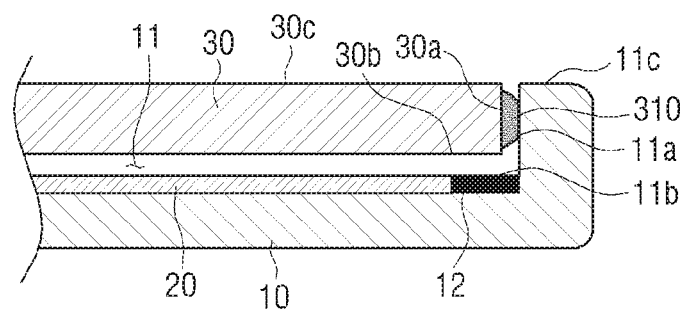

Referring to FIG. 14, the glass 30 may be placed in the receiving portion 11 to be bonded to the case 10 in a state that the first filling material 310 is cured. For example, since the first filling material 310 is in the cured state, the glass 30 may be compulsorily inserted into and fitted to the case 10. The first filling material 310 according to the exemplary embodiment may include a material having small surface tackiness after the curing.

Figure 15:
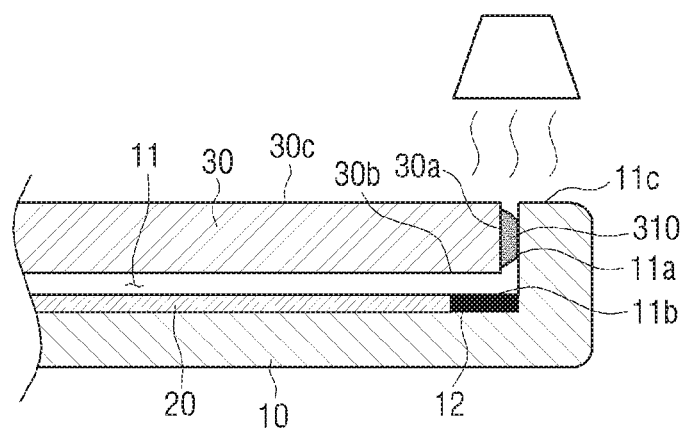

Referring to FIG. 15, heat or UV applied to the first filling material 310 so that the first filling material 310 becomes in a semi-solid state again. Accordingly, the first filling material 310 may be uniformly spread between the inner side 11a of the receiving portion 11 and the outer side 30a of the glass 30.

Figure 16:
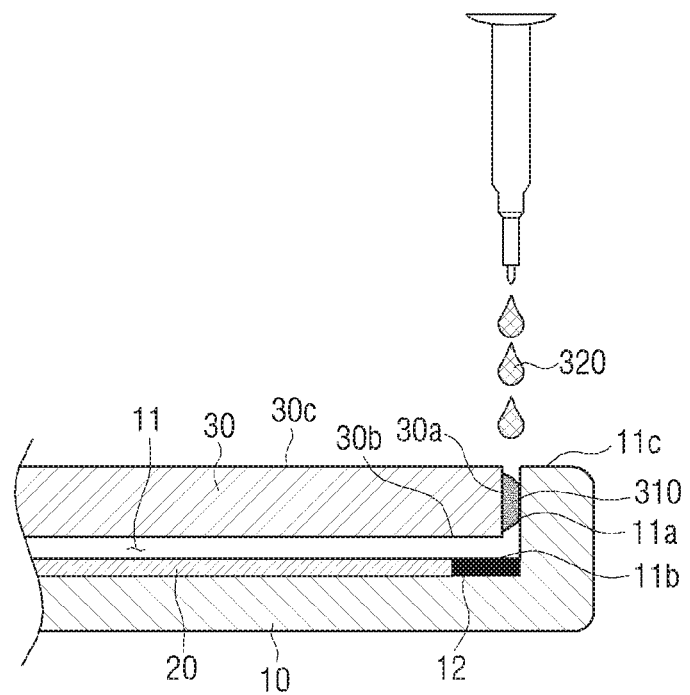

Referring to FIG. 16, the second filling material 320 may be applied between the case 10 and the glass 30 which the first filling material 310 is included therebetween. The second filling material 320 may be applied through any one of a dispensing method and a jetting method as in the first exemplary embodiment. For example, the second filling material 320 may be applied through the jetting method for finer applying.

Referring to FIG. 17, the second filling material 320 may be applied until the portion of the front 30c of the glass 30 and the portion of the front 11c of the case 10 are covered. Accordingly, the second filling material 320 may also be provided to protrude from the case 10 and the glass 30.

Subsequently, the second filling material 320 may be cured. As in the first exemplary embodiment, various curing methods may be applied to cure the second filling material 320. The coating treatment may be performed on the protruding portion of the second filling material 320.

According to the display apparatus 3 according to the third exemplary embodiment, the transfer of the shock applied to the side thereof to the glass 30 may be minimized and the robust bonding between the glass 30 and the case 10 may be accomplished. The amount of the first filling material 310 may be reduced and thus manufacturing cost may be saved as compared with the first and second exemplary embodiments.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display apparatus comprising:
a case in which a receiving portion, which a display is placed therein, is formed;
a glass disposed in front of the display in the receiving portion; and
a filler provided between the glass and the case to bond the glass and the case and simultaneously to protect the glass from an external shock,
wherein the filler includes a first filling material provided between a corner of the receiving portion of the case and a corner of the glass to primarily bond the case and the glass and a second filling material provided between the case and the glass to cover a portion of a front of the glass to secondarily bond the case and the glass,
wherein the glass has a size larger than that of the display, and
wherein the first filling material is in contact with a portion of a rear and a portion of an inner side of the corner of the receiving portion and a portion of a rear and a portion of an outer side of the corner of the glass, and
wherein the second filing material from the front of the glass and the case.

2. The display apparatus as claimed in claim 1, wherein any one of the first filling material and the second filling material includes a shock-resistant material.

3. The display apparatus as claimed in claim 1, wherein the first filling material includes a thixotropic material.

4. The display apparatus as claimed in claim 3, wherein the second filling material includes a material having thixotrophy less than the first filling material.

5. The display apparatus as claimed in claim 1, wherein the first filling material includes a thermoplastic material.

6. The display apparatus as claimed in claim 1, wherein the second filling material covers a portion of a front of the case.

7. The display apparatus as claimed in claim 1, wherein a portion of the filler in which the second filling material is provided is coating-treated.

8. The display apparatus as claimed in claim 1, wherein the first filling material is provided to bond a rear and an inner side of the receiving portion in the case and a rear and an outer side of the glass.

9. The display apparatus as claimed in claim 8, wherein a groove in which the first filling material is to be provided is further formed in a corner portion of the receiving portion of which the rear and the inner side intersect with each other.

10. The display apparatus as claimed in claim 1, wherein the first filling material is provided to bond the inner side of the receiving portion in the case and the outer side of the glass.

11. The display apparatus as claimed in claim 1, wherein the case further includes at least one segment portion formed in a circumference of an outer side thereof to enable wireless communication, and
wherein the filler bonds the case, the glass, and the segment portion.

12. A method of manufacturing a display apparatus, the method comprising:
primary bonding a case and a glass through a first filling material having a shock resistance; and
secondary bonding the case and the glass through a second filling material provided close to the first filling material and having a shock resistance,
wherein the second filling material in the secondary bonding is provided to cover a portion of a front of the glass and to protrude from the front of the glass and the case,
wherein the glass has a size larger than that of a display placed in a receiving portion of the case, and
wherein the first filling material is in contact with a portion of a rear and a portion of an inner side of a corner of the receiving portion and a portion of a rear and a portion of an outer side of a corner of the glass.

13. The method as claimed in claim 12, wherein the first filling material is cured in the primary bonding in a state that the first filling material is applied in a rear and an inner side of a receiving portion of the case in which the display is placed and then the case and the glass are bonded to each other.

14. The method as claimed in claim 13, wherein the first filling material in the primary bonding is applied into a groove formed in a corner portion of the case in which the rear and the inner side of the receiving portion intersect with each other.

15. The method as claimed in claim 12, wherein the case and the glass in the primary bonding are bonded in a state that the first filling material is applied on an outer side of the glass and then cured.

16. The method as claimed in claim 15, further comprising allowing the first filling material to be a semi-solid state and to be spread in the outer side of the glass by applying heat or UV to the first filling material between the primary bonding and the secondary bonding.

17. The method as claimed in claim 12, wherein the first filling material is applied on the case or the glass through a dispensing method in the primary bonding.

18. The method as claimed in claim 12, wherein the second filling material is applied on a portion of the case or the glass in which the first filling material is provided through a jetting method in the secondary bonding.

19. The method as claimed in claim 12, wherein the first filling material is applied on the case or the glass and cured in the primary bonding,
the second filling material is applied on a portion of the case or the glass in which the first filling material is provided and cured in the secondary bonding, and
any one of the curing in the primary bonding and the curing in the secondary bonding is performed through any one among a room temperature wet curing method, a UV curing method, a thermal curing method, and a laser curing method.

20. The method as claimed in claim 12, further comprising performing a coating treatment on a portion of the case or the glass in which the second filling material is provided after the secondary bonding.

\* \* \* \* \*